United States Patent
Kniplitsch et al.

(10) Patent No.: US 10,469,633 B2
(45) Date of Patent: Nov. 5, 2019

(54) LOW-LATENCY PIPELINE FOR MEDIA-TO-ETHERNET FRAME PACKAGING

(71) Applicant: Marvell World Trade Ltd., St. Michael (BB)

(72) Inventors: Thomas Kniplitsch, Insheim (DE); Manfred Kunz, Rastatt (DE); Lukas Reinbold, Oberkirch-Stadelhofen (DE)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/973,572

(22) Filed: May 8, 2018

(65) Prior Publication Data

US 2019/0306287 A1 Oct. 3, 2019

Related U.S. Application Data

(60) Provisional application No. 62/650,187, filed on Mar. 29, 2018.

(51) Int. Cl.
*H04J 3/16* (2006.01)
*H04L 29/08* (2006.01)
(Continued)

(52) U.S. Cl.
CPC ............ *H04L 69/324* (2013.01); *H04L 7/005* (2013.01); *H04L 47/36* (2013.01)

(58) Field of Classification Search
CPC ..... H04H 20/81; H04L 1/0001; H04L 1/0071; H04L 1/205; H04L 29/06068;
(Continued)

(56) References Cited

U.S. PATENT DOCUMENTS 4,993,025 A * 2/1991 Vesel .................... H04N 1/001
370/450
5,646,941 A 7/1997 Nishimura et al.
(Continued)

OTHER PUBLICATIONS

Wang et al, RFC 6184, RTP Payload Format for H.264 Video, 101 pages, May 2011.*
(Continued)

*Primary Examiner* — Frank Duong

(57) ABSTRACT

A conversion pipeline includes a media input stage, a packetizer, a MAC engine and a PHY interface. The media input stage is configured to receive from a media source a sequence of media frames carrying media content. The packetizer is configured to convert the media frames into a sequence of Ethernet packets by generating headers and appending portions of media frames to corresponding generated headers, including appending a first portion of a first media frame to a first generated header before the first media frame is fully received. The MAC engine is configured to commence outputting a first Ethernet packet as an uninterrupted unit, the first Ethernet packet including the first header and payload bits corresponding to the first portion of the first media frame, before the first media frame is fully received. The PHY interface is configured to transmit the Ethernet packets over a network.

14 Claims, 4 Drawing Sheets

(51) Int. Cl.
*H04L 12/805* (2013.01)
*H04L 7/00* (2006.01)

(58) Field of Classification Search
CPC ......... H04L 29/06095; H04L 29/06163; H04L 29/0653; H04L 29/08009; H04L 49/606; H04L 2012/5652; H04L 2012/5656; H04L 2012/5667; H04N 21/2365; H04N 21/2381; H04N 21/4341; H04J 3/0626; H04J 3/0682; H04W 56/0005
See application file for complete search history.

(56) References Cited

U.S. PATENT DOCUMENTS

| | | | |
|---|---|---|---|
| 6,665,754 B2* | 12/2003 | Mann | G06F 13/385 370/235 |
| 7,283,528 B1 | 10/2007 | Lim et al. | |
| 7,499,472 B2* | 3/2009 | Spitzer | H04L 12/66 370/505 |
| 7,877,514 B2* | 1/2011 | Shao | H04N 21/262 709/245 |
| 8,102,878 B2* | 1/2012 | Lee | H04L 1/0007 370/468 |
| 2001/0036196 A1 | 11/2001 | Blightman et al. | |
| 2003/0226018 A1 | 12/2003 | Tardo et al. | |
| 2004/0042483 A1 | 3/2004 | Elzur et al. | |
| 2004/0165666 A1 | 8/2004 | Kubo et al. | |
| 2005/0265383 A1 | 12/2005 | Melpignano et al. | |
| 2006/0174032 A1 | 8/2006 | Winchester et al. | |
| 2009/0046743 A1* | 2/2009 | Hamanaka | H04L 1/0006 370/498 |
| 2009/0103485 A1 | 4/2009 | Singh et al. | |
| 2009/0217318 A1 | 8/2009 | Versteeg et al. | |
| 2010/0202508 A1 | 8/2010 | Karaoguz et al. | |
| 2011/0007754 A1 | 1/2011 | Pepper et al. | |
| 2015/0256580 A1 | 9/2015 | Morton et al. | |
| 2016/0366453 A1 | 12/2016 | Yamagsh | |
| 2017/0180824 A1 | 6/2017 | Casey et al. | |
| 2019/0116246 A1 | 4/2019 | Pfister et al. | |

OTHER PUBLICATIONS

Delgado, Ethernet Primer, AMF-AUT-T0681, freescale, 69 pages, Sep. 2014.*
Ferre et al., "Robust Video Transmission Over Wireless LANs", IEEE Transactions on Vehicular Technology vol. 57, Issue 4, pp. 2596-2602, Jul. 1, 2008.
International Application # PCT/IB2018/054794 Search Report dated Sep. 12, 2018.
International Application # PCT/IB2018/055587 Search Report dated Sep. 18, 2018.
Reinbold et al., U.S. Appl. No. 16/021,040, filed Jun. 28, 2018.
Reinbold et al., U.S. Appl. No. 16/045,781, filed Jul. 26, 2018.
International Application # PCT/IB2018/053559 dated Aug. 14, 2018.
U.S. Appl. No. 16/021,040 office action dated Sep. 13, 2019.
U.S. Appl. No. 16/045,781 office action dated Aug. 21, 2019.

* cited by examiner

US 10,469,633 B2

LOW-LATENCY PIPELINE FOR MEDIA-TO-ETHERNET FRAME PACKAGING

CROSS-REFERENCE TO RELATED APPLICATIONS

This application claims the benefit of U.S. Provisional Patent Application 62/650,187, filed Mar. 29, 2018, whose disclosure is incorporated herein by reference in their entirety.

FIELD OF THE DISCLOSURE

The present disclosure relates generally to network communication, and particularly to methods and systems for conversion of media content into network packets.

BACKGROUND

Various electronic systems involve transmission of media content over a packet network, such as, for instance, an Ethernet network. For example, automotive communication systems may use a Local-Area Network (LAN) for transferring video content acquired by a video camera, and/or other media content acquired by various other sensors such as velocity sensors, accelerometers, audio sensors, infra-red sensors, RADAR sensors, ultrasonic sensors, rangefinders, and the like, to a vehicle computer.

The description above is presented as a general overview of related art in this field and should not be construed as an admission that any of the information it contains constitutes prior art against the present patent application.

SUMMARY

An embodiment that is described herein provides a conversion pipeline for converting media into Ethernet packets. The conversion pipeline includes a media input stage, a packetizer, an Ethernet Medium Access Control (MAC) engine and an Ethernet physical-layer (PHY) interface. The media input stage is configured to receive from a media source a sequence of media frames carrying media content. The packetizer is configured to convert the media frames into a sequence of Ethernet packets by generating headers and appending portions of the media frames to corresponding generated headers, including appending a first portion of a first media frame to a first generated header before the first media frame is fully received from the media source. The Ethernet MAC engine is configured to commence outputting a first Ethernet packet as an uninterrupted unit, the first Ethernet packet including the first header and payload bits corresponding to the first portion of the first media frame, before the first media frame is fully received from the media source. The Ethernet PHY interface is configured to transmit the sequence of Ethernet packets over a network.

In some embodiments, the packetizer includes a header generator configured to generate the headers concurrently with reception of the media frames, and a multiplexer (MUX) configured to interleave the headers with respective payloads that include the media content, so as to form a composite output stream. In some embodiments, the packetizer includes logic circuitry configured to detect frame markers in the sequence of the media frames, and to partition the media content into successive payloads for successive Ethernet packets in accordance with the frame markers. In an embodiment, the packetizer is configured to begin each of the payloads of the Ethernet packets with one of the frame markers.

In some embodiments, the conversion pipeline includes an elasticity buffer, which is configured to compensate for a difference in clock speed between the media input stage and the packetizer. In an embodiment, the elasticity buffer has a buffer size that is less than a single media frame. In a disclosed embodiment, the conversion pipeline includes one or more buffers configured to provide an end-to-end latency that is less than a duration of a single media frame.

In various example embodiments, the media content includes one or more of: video data, audio data, velocity data, acceleration data, infrared data, radar data, lidar data, ultrasonic imaging data, rangefinder data, proximity data, and collision avoidance data. In an embodiment, the media input stage is configured to receive input values from a sensor in addition to receiving the media frames, and the packetizer is configured to convert both the media frames from the media source and the input values from the sensor into the sequence of Ethernet packets.

There is additionally provided, in accordance with an embodiment described herein, a method for conversion of media into Ethernet packets in a hardware-implemented conversion pipeline. The method includes receiving from a media source a sequence of media frames carrying media content. The media frames are converted into a sequence of Ethernet packets by generating headers and appending portions of the media frames to corresponding generated headers, including appending a first portion of a first media frame to a first generated header before the first media frame is fully received from the media source. Outputting of a first Ethernet packet as an uninterrupted unit, the first Ethernet packet including the first header and payload bits corresponding to the first portion of the first media frame, commences before the first media frame is fully received from the media source. The sequence of Ethernet packets produced by the conversion pipeline is transmitted through a physical-layer (PHY) interface to a network.

There is further provided, in accordance with an embodiment that is described herein, a media content converter for converting media content into network packets. The converter includes logic circuitry, a header generator and a multiplexer. The logic circuitry is configured to partition the media content into payloads for the network packets. The header generator is configured to generate packet headers for the network packets, by populating with data a plurality of header fields according to a predefined header format. The multiplexer is configured to stream a sequence of the network packets for transmission over a communication network, by combining the generated packet headers from the header generator with the corresponding payloads from the logic circuitry.

In some embodiments, the header generator is configured to identify, in the header format, a header field whose value is constant across the sequence of the network packets, and to insert the constant value into the corresponding header field of the generated headers. In an example embodiment the header generator is configured to insert the constant value before the media content is received in the converter.

In some embodiments, the header generator is configured to identify, in the header format, an incremented header field whose value is incremented in successive network packets in accordance with a rule, to increment the value of the incremented header field in accordance with the rule, and to insert the incremented value into the corresponding incremented header field of the generated headers. In some embodiments, the header generator is configured to identify, in the header format, a calculated header field whose value is calculated, to calculate the value of the calculated header field, and to insert the calculated value into the calculated header field when generating the headers.

In some embodiments, the header generator includes one or more hardware registers, the hardware registers configured to hold a bit-pattern specifying numerical values for header-fields of a header of a current packet being generated. In an embodiment, the logic circuitry is configured to switch the multiplexer to transmit the header of the current packet from the hardware registers, and then switch the multiplexer to transmit a payload of the current packet. In an embodiment, the header generator is configured to update one or more of the values of the header-fields in the hardware registers between successive network packets.

In a disclosed embodiment, the converter further includes a header format selector configured to select the header format from among two or more different predetermined header formats, and to provide the selected header format to the header generator. In an embodiment, the logic circuitry, the header generator and the multiplexer are hardware-implemented.

There is also provided, in accordance with an embodiment that is described herein, a method for converting media content into network packets. The method includes partitioning the media content into payloads for the network packets. Packet headers are generated for the network packets, by populating with data a plurality of header fields according to a predefined header format. A sequence of the network packets is generated for transmission over a communication network, by combining the generated packet headers with the corresponding payloads.

The present disclosure will be more fully understood from the following detailed description of the embodiments thereof, taken together with the drawings in which:

DETAILED DESCRIPTION OF EMBODIMENTS

Figure 1:
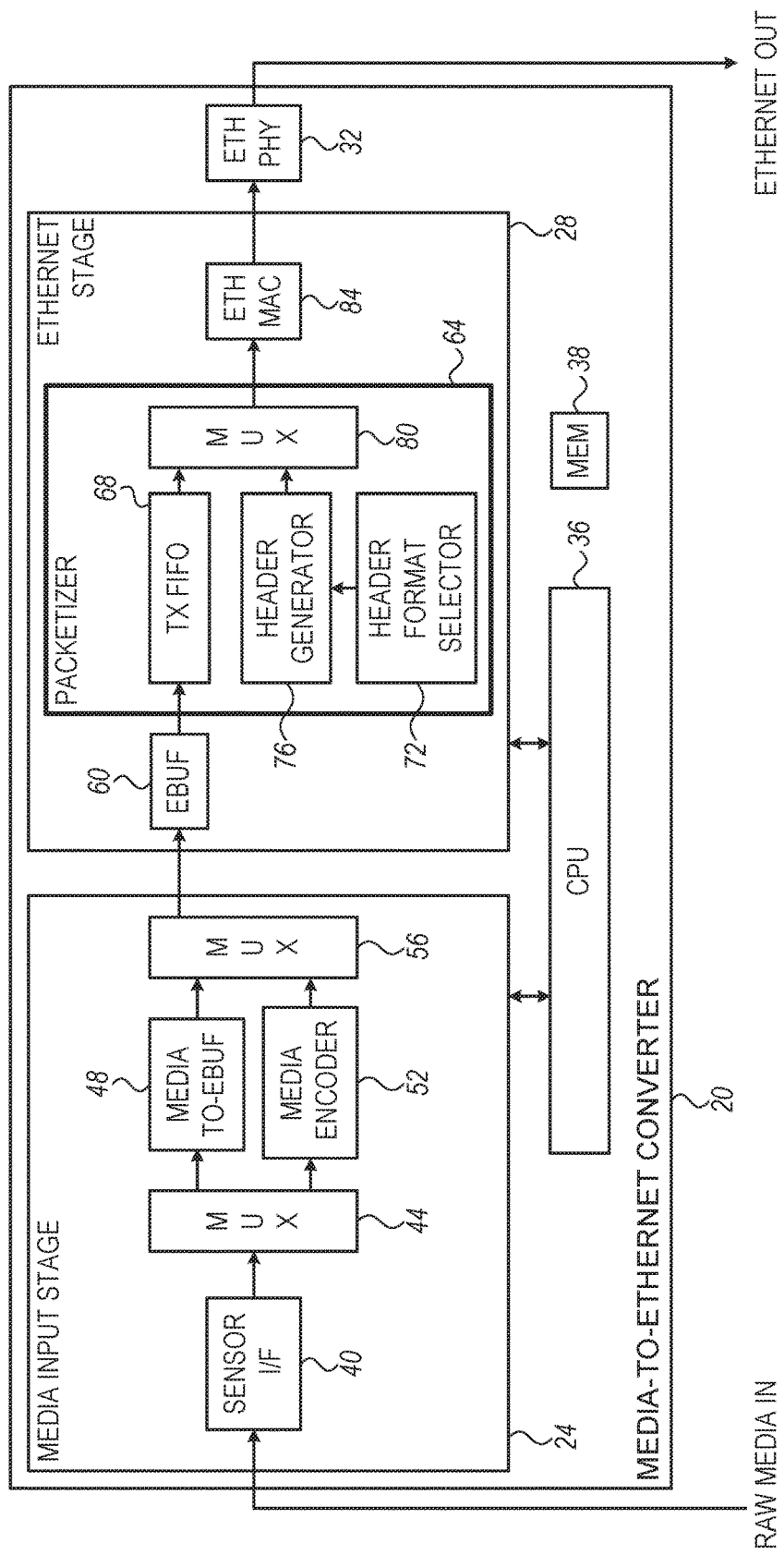
FIG. 1 is a block diagram that schematically illustrates a media-to-Ethernet converter, in accordance with an embodiment that is described herein.

Embodiments that are described herein provide improved methods and apparatus for converting media content into network communication packets. The disclosed techniques are especially useful in applications that require very low latency. One example of such an application is an automotive system, in which video content, and/or outputs of various sensors, is to be converted into Ethernet packets and transmitted to a central vehicle computer. The techniques described herein are useful, however, in various other applications, which are not necessarily latency-sensitive.

The description that follows refers in some locations mainly to video content, by way of example only. It is specifically intended, however, that other suitable types of sensors and other suitable types of data, including but not limited to velocity sensors and velocity data, accelerometers and acceleration data, audio sensors and audio data, infrared sensors and infra-red data, radar sensors and radar data, lidar sensors and lidar data, ultrasonic sensors and ultrasonic data, rangefinders and proximity data, collision avoidance imaging and collision avoidance imaging data, and the like, are addressed, as well, are suitably handled by apparatus having components and functionalities described herein, and are covered by this description and the claims that follow.

The description that follows refers in some locations mainly to raw media content that is provided in a sequence of media frames. It is specifically intended, however, that other suitable types of data, not necessarily framed and not necessarily media, e.g., streamed media or sporadic data provided by one or more sensors, are addressed, as well, are suitably handled by apparatus having components and functionalities described herein, and are covered by this description and the claims that follow.

In some embodiments, the disclosed techniques are performed by a media-to-Ethernet converter, which comprises a conversion pipeline implemented entirely in hardware. The conversion pipeline comprises a media input stage followed by an Ethernet stage. The media input stage is configured to receive a sequence of media frames carrying raw video content from a media source, e.g., a video camera. The Ethernet stage comprises a packetizer, which is configured to convert the media frames into a sequence of data packets that are compliant with Ethernet or other suitable data network standards. Although the description that follows refers mainly to Ethernet, by way of example, it is specifically intended for the term Ethernet to encompass any suitable current or future packet based data network.

In some embodiments the packetizer converts media frames into Ethernet packets by generating Ethernet headers, on-the-fly, without writing frames into memory or subsequently reading frames from memory as the Ethernet packets are being formed, and appending portions of the media frames to the Ethernet headers. The sequence of Ethernet packets is transmitted over an Ethernet network, e.g., an in-car Local-Area Network (LAN), by an Ethernet Medium Access Control (MAC) engine followed by an Ethernet physical-layer (PHY) interface.

The media-to-Ethernet converter typically comprises a Central Processing Unit (CPU) or other suitable processor that runs suitable software, e.g., for communication with a host system, for general management and configuration, and/or other non-real-time tasks. The conversion pipeline (the "data path"), however, is implemented entirely in hardware. Moreover, the data path does not involve any Direct Memory Access (DMA) operations or interrupts, in an embodiment. The disclosed media-to-Ethernet conversion process is therefore characterized by extremely low latency.

For example, the packetizer typically appends a portion of a video frame to a corresponding packet header before the video frame is fully received by the media input stage. Similarly, the Ethernet MAC engine typically starts outputting an Ethernet packet, which comprises payload bits belonging to a video frame, before this video frame is fully received by the media input stage.

Data buffering, when used in the conversion pipeline, is used for compensating for differences in clock speed between different stages of the pipeline, not for batch processing of entire frames. As such, data buffering in the conversion pipeline is limited to a small fraction of a video frame and is generally.

Inasmuch as the end-to-end latency of the conversion pipeline, from inputting data, such as a pixel, into the media input stage until outputting the corresponding payload bits by the Ethernet PHY interface, is designed to be much less than the time duration required to receive a complete media frame, such as video frame, buffers are disposed in the conversion pipeline to synchronize between receipt of a media frame and the time required by the pipeline to convert the media frame into an Ethernet packet, in an embodiment. The buffers are sized to avoid starvation conditions whereby the pipeline might stall or output incomplete packets because media to be inserted into a packet has not been fully received before the packet is output from the conversion pipeline.

In some embodiments that are described herein, the packetizer comprises a header generator, which generates the packet headers on-the-fly using one or more configurable hardware registers (referred to as a "header template") in accordance with a predefined header format. The header format specifies the various header fields, e.g., in the form of a bit-pattern.

In some embodiments, the header format specifies the types and/or numerical values of the header fields. Examples of types of header fields comprise (i) a "constant" field whose value is constant across the sequence of packets, (ii) an "incremented" field whose value is incremented in successive packets in accordance with a rule, and (iii) a "calculated" field whose value is calculated over at least part of the payload of the respective packet. When generating a header for a certain packet, the header generator calculates a value for each field according to the type of field, as specified in the header format.

In some embodiments, the header format is selected from a set of predefined header formats, e.g., during production of the media-to-Ethernet converter. This feature enables, for example, the same media-to-Ethernet converter to operate in different host systems that use different communication protocols and require different header formats.

Example implementations of the media-to-Ethernet converter, and associated methods, are described and explained in detail below.

FIG. 1 is a block diagram that schematically illustrates a media-to-Ethernet converter 20, in accordance with an embodiment that is described herein. In the present example, media-to-Ethernet converter 20 is deployed as part of a safety or self-drive sub-system in an automotive vehicle, and is used for converting video, or other sensor data, acquired by a camera, or other sensor, into Ethernet frames. Alternatively, similar media-to-Ethernet converters can be used in other types of host systems and applications.

In the embodiment of FIG. 1, media-to-Ethernet converter 20 comprises a hardware-implemented conversion pipeline comprising a media input stage 24, an Ethernet stage 28 and an Ethernet Physical-layer (PHY) stage 32. The conversion pipeline receives a sequence of raw media frames, and outputs a sequence of Ethernet packets whose payloads carry the media content. A Central Processing Unit (CPU) 36 manages and configures the various elements of the conversion pipeline, in an embodiment. CPU 36 typically is responsible for communication with the host system, and for various other functions that are not on the real-time data-path of media-to-Ethernet conversion.

In an embodiment, media-to-Ethernet converter 20 comprises a memory 38, typically a Random Access Memory (RAM). Memory 38 is used, for example, by CPU 36 for storing suitable information. Memory 38 typically is not connected and not accessed by the conversion pipeline. As explained herein, the conversion pipeline converts the media frames into the Ethernet packets without writing or reading media frames to and from memory.

In an embodiment, media input stage 24 comprises a sensor interface 40, a multiplexer (MUX) 44, a media-to-elasticity-buffer (media-to-ebuf) converter 48, a media encoder 52, and a MUX 56. Sensor interface 40 is configured to connect to a sensor and receive the sequence of raw media frames. In the present example, the sensor comprises an image sensor, e.g., a video camera, and the media frames comprise raw video frames, however in other embodiments the sensor comprises any other suitable sensor.

In the present context, the term "raw" means that the video is not compressed, so that each pixel is represented by a respective numerical value independently of other pixels and/or other video images in the sequence. Any suitable video format can be used. Example video formats include, for example, without limitation, RAW8, RAW10, RAW12, RAW14, RGB888, RGB656, YUV444, YUV422, YUV420 and YUV411. Such formats differ from one another, for example, in pixel depth (number of bits per pixel) and/or in chroma sample rate. Sensor interface 40 may support any suitable camera interface, or multiple interfaces, such as, for example, without limitation, various parallel interfaces having horizontal/vertical sync (HSYNC/VSYNC), MIPI CSI-2, MIPI CSI-3, or any other interface. The disclosed techniques are not limited to raw video, but are applicable to any video format. Moreover, the disclosed techniques are not limited to video, and are applicable to various other types of media as noted above.

In various embodiments, sensor interface 40 receives the video as a serial bit stream or as a parallel word stream. MUX 44 routes the video frames to media-to-ebuf converter 48 or to media encoder 52, as appropriate. Typically, media encoder 52 is used when the video is to be compressed before egress from the media-to-Ethernet converter. Media-to-ebuf converter 48 is used otherwise, i.e., when the raw video is to be transmitted without compression.

Typically, media-to-ebuf converter 48 is configured to convert the incoming media, which complies with one of several possible formats, to a fixed format that is expected at the input of an elasticity buffer (ebuf) 60 in Ethernet stage 28. media-to-ebuf converter 48 typically has a sensor-specific input interface. For raw video, for example, the input interface may comprise eight, ten, twelve or sixteen bits of pixel data, plus sideband signals that define vertical and horizontal synchronization information (e.g., v_sync, h_blank). The synchronization information determines the start and end of each video frame, and the start and end of each video line within the frame. This synchronization information may also be coded into the pixel data.

In some embodiments, the output of media-to-ebuf converter 48 is provided to ebuf 60. The format at the input of ebuf 60 is typically sensor-independent. In an embodiment, the input to ebuf 60 comprises 32-bit data, plus 4-bit byte-valid information and 4-bit sideband information. The sideband information signals events such as start and end of a video frame, video line and/or video unit. media-to-ebuf converter 48 collects the incoming pixel information, derives (depending on the input interface protocol) synchronization information either from the input sideband signals or from the pixel data, and assembles the data in 32-bit groups that are accompanied by byte valid information and 4-bit sideband information, as expected by ebuf 60. Video-to-ebuf converter 48 is typically specific to the application and sensor type. The output of the media-to-ebuf converter 48 typically has the same format regardless of application and sensor type. Therefore, the design of Ethernet stage 28 and its components is independent of the sensor and media type.

The output of media encoder 52 or of Media-to-ebuf converter 48 is provided via MUX 56 as the output of media input stage 24. Control of MUX 56 is addressed in detail in FIG. 2 below. In an embodiment, media input stage 24 parses the video stream at the boundaries between video frames, or other suitable boundaries in media frames, and inserts suitable frame markers such as Start-Of-Frame (SOF) and End-Of-Frame (EOF) markers. In other embodiments, e.g., when packetizing media that is not framed, e.g., streaming media or sporadic data from a sensor, any other suitable scheme can be used for parsing the media or data into packets.

When the video applicable video format comprises Network Abstraction Layer Units (NALUs), such as in H.264 compressed video, frame markers may comprise Start-Of-NALU (SON) and End-Of-NALU (EON) markers. After compression, the video frames and the NALUs have variable lengths. Ethernet packets of up to 1,500 bytes are typically too small to carry a complete video frame. For raw (uncompressed) video, an Ethernet packet typically carries one video line or a fraction of a line. In such embodiments, SON/EON markers serve as start/end of line indications. For H.264 compressed video, for instance, media encoder 52 is typically configured to produce NALUs of a size that fits into one Ethernet packet. In these embodiments, SON/EON markers serve as indications of the start and end of NALUs.

In some embodiments, sensor interface 40 receives media content from one or more other sensors for conversion into Ethernet packets, either alternatively or additionally to the video frames. Example types of sensors and content include, but are in no way limited to, velocity sensors and velocity data, accelerometers and acceleration data, audio sensors and audio data, infra-red sensors and infra-red data, radar sensors and radar data, lidar sensors and lidar data, ultrasonic sensors and ultrasonic data, rangefinders and proximity data such as in collision avoidance data and applications, and the like.

In some embodiments, media input stage 24 is implemented separately from the rest of media-to-Ethernet converter 20, e.g., on a standalone semiconductor die or in a standalone device. Additionally or alternatively, in some embodiments Ethernet stage 28 is implemented on a standalone die that is separate from media input stage 24 and/or from CPU 36. In an embodiment, media input stage 24, Ethernet stage 28 and CPU 36 are packaged together in a unified package, or are respectively disposed on a circuit board and coupled together. In an alternative embodiment, media input stage 24, Ethernet stage 28 and CPU 36 are formed as separate modules and disposed on the same integrated circuit substrate.

Such implementations enable, for example, media-to-Ethernet converter 20 to be fabricated modularly, e.g., to suit different host systems using different variants of media input stage 24 but the same Ethernet stage 28. Different variants of media input stage 24 may differ from one another, for example, in the types of sensors and/or media formats they support.

The media content (in the present example video content) from media input stage 24 is provided to Ethernet stage 28.

In some embodiments, Ethernet stage 28 comprises an elasticity buffer (ebuf) 60, a packetizer 64, and an Ethernet Medium Access Control (MAC) engine 84.

Elasticity buffer (ebuf) 60 buffers the video stream provided by media input stage 24, including frame markers if used. Ebuf 60 compensates for rate variations and bursts in the output of media input stage 24. Bursts at the output of media input stage 24 occur, for example, when the video is being encoded by media encoder 52, which typically outputs one code word at a time with idle intervals between code words. The size of ebuf 60 is typically equivalent to a fraction of a video frame.

In some embodiments, the size of elasticity buffer 60 is typically derived from a worst-case estimation of the difference in clock speed between media input stage 24 (whose clock is typically synchronized with the sensor's pixel clock) and Ethernet stage 28 (whose clock speed is typically dependent on the network speed, e.g., 1 Gb/s or 100 Mb/s).

Packetizer 64 converts the sequence of media frames into a sequence of Ethernet packets, as described in detail below. Throughout the present disclosure and in the claims, clear distinction is made between the terms "frame" and "packet." The term "frame" refers to a structural data unit of the media protocol of the media (e.g., video) entering media-to-Ethernet converter 20. The term "packet" refers to a structural data unit of the network communication protocol (e.g. Ethernet) used for communication over the data network.

In the example of FIG. 1, packetizer 64 comprises a transmit First-In First-Out memory (TX FIFO) 68, a header format selector 72, a header generator 76 and a MUX 80. Further aspects of the internal structure of packetizer 64 are addressed in FIG. 2. The operation of packetizer 64 is explained in detail further below.

The Ethernet packets produced by packetizer 64 are transmitted over an Ethernet network (not shown in the figures) by Ethernet MAC engine 84 and Ethernet PHY interface 32, which perform the MAC and PHY layers of the Ethernet protocol, respectively. As noted above, MAC engine 84 typically starts encapsulating and outputting an Ethernet packet, which comprises payload bits belonging to a certain video frame, before this video frame is fully received by media input stage 24. The Ethernet packets may be sent over the network to any suitable destination, e.g., a central vehicle computer.

Figure 2:
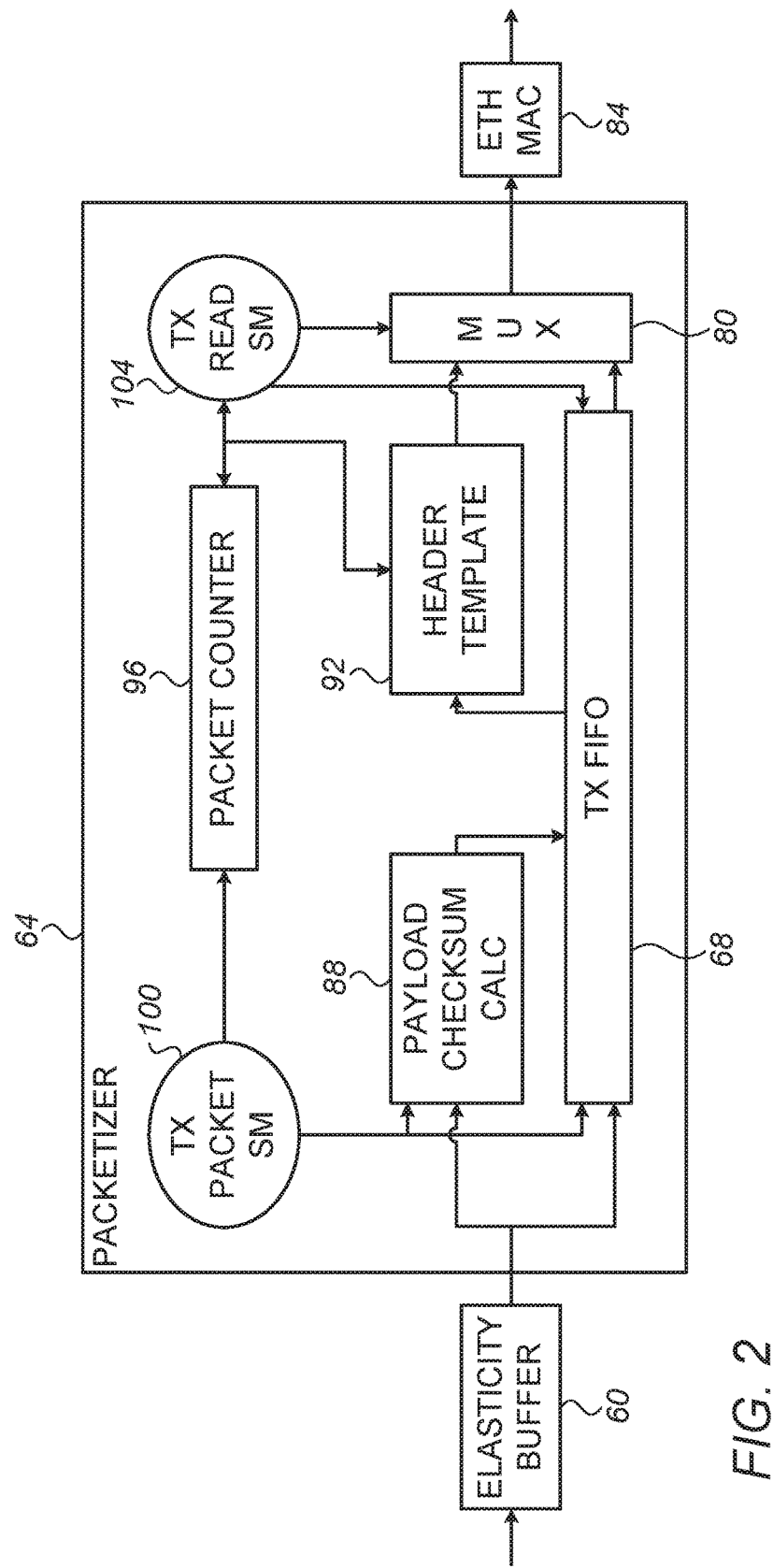
FIG. 2 is a block diagram that schematically illustrates a packetizer used in the media-to-Ethernet converter of FIG. 1, in accordance with an embodiment that is described herein.

FIG. 2 is a block diagram that schematically illustrates the internal structure of packetizer 64 used in media-to-Ethernet converter 20 of FIG. 1, in accordance with an embodiment that is described herein. The figure focuses on the ancillary logic circuitry surrounding TX FIFO 68. Generally speaking, TX FIFO 68 is used for buffering media content that is to be sent as payload of a packet, possibly along with relevant metadata, while the ancillary logic circuitry performs the operations and calculations for generating the header for that packet.

In the example of FIG. 2, the ancillary logic circuitry of packetizer 64 comprises a payload checksum calculation module 88, a header template module 92, a packet counter 96, a TX packet state machine (SM) 100 and a TX read SM 104. Header format selector 72 and header generator 76 shown in FIG. 1 are not shown in the present figure, for the sake of clarity. Payload checksum calculation module 88 and header template 92 are typically part of header generator 76.

Payload checksum calculation module 88 calculates the applicable checksum over the payload of the current Ethernet packet. Header template module 92 (also referred to simply as "header template") holds the header field values for the current Ethernet packet, e.g., in bit-pattern format in one or more hardware registers. Packet counter 96 counts the Ethernet payloads waiting for transmission. A counter value larger than zero means that the payload of at least one Ethernet packet is complete and ready for transmission in TX FIFO 68. Typically, TX packet SM 100 increments counter 96 when a payload is fully written into TX FIFO 68, and TX read SM 104 decrements counter 96 when a payload is fully streamed via MUX 80.

In an embodiment, under control of TX packet SM 100, video content is written from ebuf 60 into TX FIFO 68. SM 100 also divides the video stream into Ethernet packets. SM 100 scans the video stream, searching for frame markers, line markers and/or NALU markers (e.g., SOF, EOF, SON, EON). Based on the frame markers, SM 100 assigns portions of the video content between frame markers to become payloads for respective Ethernet packets.

It is noted that typically a single video frame is split into portions that are spread across several Ethernet packets. SM 100 limits the size of each portion so that a resulting packet payload will produce a packet that is less than or equal to the Maximum Transmission Unit (MTU) size according to a transmission protocol, such as for example TCP or UDP, which is used for transmitting packets. In addition, in an embodiment, SM 100 starts each new video frame, line or NALU in a new Ethernet packet. SM 100 typically marks the end of a payload by inserting an End-Of-Packet (EOP) marker into the video stream in TX FIFO 68.

In an example implementation, if the payload of a certain packet reaches the MTU size and no EOF or EON is encountered, SM 100 terminates the current payload, and sets a "fragmentation" flag. SM 100 typically inserts the fragmentation flag into the video stream in TX FIFO 68. The fragmentation flag is typically read from TX FIFO 68 by TX read SM 104 and written to header template 92. SM 100 also terminates the payload of the current Ethernet packet in response to identifying EOF or EON in the video stream, so that the next video frame, line or NALU will begin in a new Ethernet packet.

In an embodiment, SM 100 also controls payload checksum calculation module 88. SM 100 writes the video content from ebuf 60 to payload checksum calculation module 88, in parallel to writing the video content into TX FIFO 68. For each Ethernet packet, SM 100 waits until checksum calculator 88 has finished calculating the payload checksum, and then inserts the checksum value into the video stream in TX FIFO 68. The checksum value is typically extracted from TX FIFO 68 by TX read SM 104 and written to header template 92, thereby populating a checksum value in a packet header in accordance with header template 92.

In an embodiment, Tx SM 100 also generates a timestamp value for each Ethernet packet, and inserts the timestamp value into the video stream in TX FIFO 68. Any suitable trigger can be used for generating the timestamp. The timestamp value typically is extracted from TX FIFO 68 by TX read SM 104 and written to header template 92. Typically, SM 100 also writes the length of the payload into the video stream in TX FIFO 68, to be extracted and written to the header template by SM 104.

In an embodiment, Tx SM 100 writes the header field values (timestamp, payload checksum, payload length) in a dedicated word inserted into the video stream in TX FIFO 68. When the above operations are complete, TX packet SM 100 increments packet counter 96 to indicate that another payload is ready for transmission.

TX read SM 104 is typically responsible, per Ethernet packet, for reading the payload data and associated header field values (timestamp, payload checksum, payload length) from TX FIFO 68, updating header template 92, and transmitting the header and payload via MUX 80 to Ethernet MAC engine 84. Thus, TX read SM 104 serves as a selector that selectively controls MUX 56 to alternate between header and payload inputs, so as to generate complete Ethernet packets.

In an embodiment, in response to detecting that packet counter 96 has a non-zero value (meaning that at least one payload is ready in TX FIFO 68), TX SM 104 is triggered to begin processing the next Ethernet packet. Specifically, in an embodiment, SM 104 then reads the dedicated word that comprises the header field values (timestamp, payload checksum, payload length) from TX FIFO 68, and populates header template 92 with these values. Before updating the checksum field in the header template, SM 104 typically calculates a final checksum value for the Ethernet packet, based on the payload checksum provided by SM 100, and possibly one or more additional partial checksum values for the packet.

In some embodiments, the final checksum value is a sum of (i) a partial checksum for constant-value header fields (which is constant and calculated once at initialization of the header template), (ii) a partial checksum for values of variable-header fields (including timestamp and packet length calculated from header length plus payload length, which are not available before the payload is fully written to TX FIFO 68) and (iii) a partial checksum for the payload. Calculation of the final checksum typically takes several clock cycles, e.g., by accumulating sixteen bits per clock cycle.

When the current Ethernet packet is ready for egress from media-to-Ethernet converter 20, SM 104 typically causes the header of the packet to be transmitted from header template 92, for example by signaling MUX 80 to select header template 92. After transmitting the header, Tx SM 104 signals MUX 80 to select TX FIFO 68, which subsequently begins transmitting the payload from the TX FIFO via MUX 80. Streaming of the payload continues until reaching the EOP marker (which was inserted by TX SM 100 into the video stream in TX FIFO 68). When the packet transmission is completed, TX SM 104 decrements packet counter 96. Upon completion of packet transmission, SM 104 also performs additional actions, such as updating certain header fields for the next packet (e.g., fragmentation offset or sequence number), in an embodiment.

The configurations of media-to-Ethernet converter 20 and its components, such as media input stage 24 and Ethernet stage 28 including packetizer 64, as shown in FIGS. 1 and 2, are example configurations that are depicted solely for the sake of clarity. In alternative embodiments, any other suitable configurations can be used. Elements that are not mandatory for understanding of the disclosed techniques have been omitted from the figures for the sake of clarity.

The different elements of media-to-Ethernet converter 20 may be implemented using dedicated hardware or firmware, such as using hard-wired or programmable logic, e.g., in an Application-Specific Integrated Circuit (ASICs) or Field-Programmable Gate Array (FPGA). Elasticity buffer 60 and TX FIFO 68 may comprise any suitable type of memory, e.g., Random Access Memory (RAM).

Typically, CPU 36 comprises a general-purpose processor, which is programmed in software to carry out the functions described herein (e.g., communication with a host system, general management, and/or other tasks that do not necessarily need to be performed in real time or at wire-speed). The software may be downloaded to the processor in electronic form, over a network, for example, or it may, alternatively or additionally, be provided and/or stored on non-transitory tangible media, such as magnetic, optical, or electronic memory.

Figure 3:
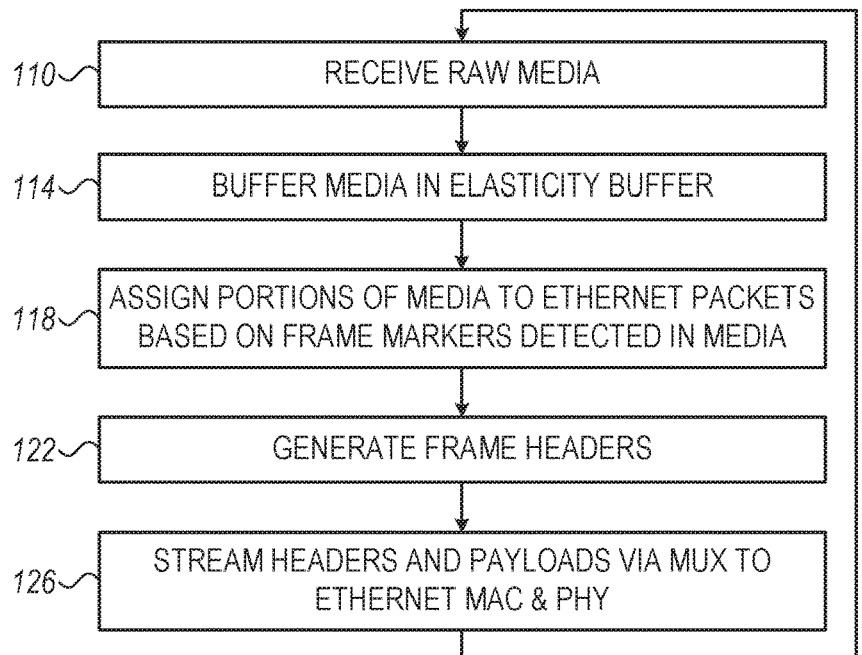
FIG. 3 is a flow chart that schematically illustrates a method for media-to-Ethernet conversion, in accordance with an embodiment that is described herein.

FIG. 3 is a flow chart that schematically illustrates a method for media-to-Ethernet conversion, in accordance with an embodiment that is described herein. The method begins with sensor interface 40 receiving raw video from the image sensor, at an input operation 110. Media input stage 24 optionally encodes the raw video content. Media input stage 24 outputs the video content for buffering in ebuf 60, at an elasticity buffering operation 114.

At a parsing operation 118, packetizer 64 assigns portions of the video to serve as payloads of respective Ethernet packets. At a packet generation operation 122, packetizer 64 generates headers for the Ethernet packets. At a transmission operation 126, packetizer 64 streams the headers and payloads of the Ethernet packets, en-route to MAC engine 84 and PHY interface 32.

In some embodiments, media-to-Ethernet converter 20 is configurable to selectively support packet header formats of various protocols. Ethernet-based header types that differ from one another in header format and/or content comprise, for example, Ethernet MAC header, IPv4 header, IPv6 header, User Datagram Protocol (UDP) header, Real-Time Protocol (RTP) header, RTP header for RAW Video Format (RVF), Audio Video Transport Protocol (AVTP) header, AVTP header for RVF, Motion JPEG (MJPEG) header and/or other headers compliant with other suitable Ethernet or other protocols.

Each header format specifies a certain header-field configuration, e.g., the type, definition, location in the header, size, and possibly numerical value of each header field. Different header formats may differ from one another in any such parameter, for example. In various embodiments, media-to-Ethernet converter 20 supports any suitable subset of packet header formats, e.g., from a single format to all formats. CPU 36 typically holds the definitions of the (one or more) header formats supported by media-to-Ethernet converter 20, and configures packetizer 64 with the header format to be used for conversion.

Typically, selection and configuration of the header format are performed offline, not during normal operation. In such embodiments, CPU 36 provides the appropriate header format to header format selector 72 offline, e.g., on initialization, during production or during post-production testing. In this manner, a given media-to-Ethernet converter 20 that operates in a given host system will always use the same header format, in an embodiment, but different media-to-Ethernet converters of the same type can be installed and operated in various host systems that require different header formats. In alternative embodiments, however, CPU 36 may instruct header format selector 72 to switch to a different header format, from among the supported formats, at any suitable time, e.g., during normal operation in a host system.

In either case, header format selector 72 configures header generator 76 with the selected header format to be used. Header generator 76 generates headers for the Ethernet packets in accordance with the selected header format. As explained above, header template 92 (shown in FIG. 2) comprises one or more hardware registers that packetizer 64 populates, per Ethernet packet, with the numerical values of the header fields for that packet. When fully populated, packetizer 64 streams the content of header template 92 followed by the corresponding packet payload.

In some embodiments, the definition of a header format distinguishes between two or more different types of header fields. In these embodiments, the header format provided to header generator 76 specifies the type of each header field. When populating header template 92 for generating the header of the current Ethernet packet, header generator 76 calculates the numerical value differently for each type of field.

In an example embodiment, the header format classifies the header fields into the following types:

"Constant"-type fields. The numerical value of a "constant"-type field is retained constant by header generator 76 across the sequence of Ethernet packets. Examples of "constant"-type fields are IP version, and source and destination MAC and IP addresses, to name just a few. In some embodiments, the numerical value of a "constant"-type field is set in header template 92 before the media content is received, e.g., offline when the header format is selected and initialized.

"Incremented"-type fields. The numerical value of an "incremented"-type field is incremented by header generator 76 from one packet to the next in accordance with a rule. The rule is also specified in the header format. In some embodiments, although not necessarily, the rule defines that the numerical value is to be increased by one from one packet to the next. An example of an "incrementing"-type field is a sequence number. In some embodiments, the numerical value of an "incrementing"-type field is set in header template 92 before the payload for this packet is fully available, e.g., as soon as the previous header has been transmitted and header template 92 can be modified.

"Calculated"-type fields. The numerical value of a "calculated"-type field is calculated by header generator 76 in a predefined manner, e.g., a formula. In some embodiments, although not necessarily, header generator 76 calculates the numerical value of a "calculated"-type field over at least part of the payload of the respective packet. Examples of a "calculated"-type fields are a checksum field and a length (e.g., byte-count) field.

In some embodiments, header generator 76 does not necessarily increment an "incremented"-type field by one per packet. For example, if a video line does not fit into a single packet, then a video-line-number field within a header may be incremented by one only every two or three packets. As another example, a video-frame-number field may be incremented after the last packet of that video frame. The header may also have a sequence number for a video line spread across multiple packets, which is reset to 0 for each first packet of a line and then incremented in the following packets of the same line.

In some embodiments, header generator 76 does not necessarily calculate a "calculated"-type field over the payload. Some "calculated"-type fields may not depend on the payload at all. One example is a timestamp field that header generator 76 calculates by adding a configurable offset to the sampled Precision Time Protocol (PTP) Timer value. Another example is a "fragmentation offset" field value for a video line spreading across multiple packets. Header generator 76 calculates such a field by summing the byte-counts of the previous packets for the same video line.

Another example of a calculated header field is a flag (single-bit field) that indicates a certain event. For example, a flag indicating the last packet for a video frame may be calculated by header generator 76 from coincidence of end-of-frame and end-of-line indications. As another example, a "timestamp valid" (TV) field in an AVTP header may be set to 1 for all packets, or only for specific packets according to a scheme that is selected by a configuration register (e.g. TV=1 only for the first or last packet of a video frame). As yet another example, a hardware mechanism may set an error flag in a packet header upon detecting errors.

Figure 5:
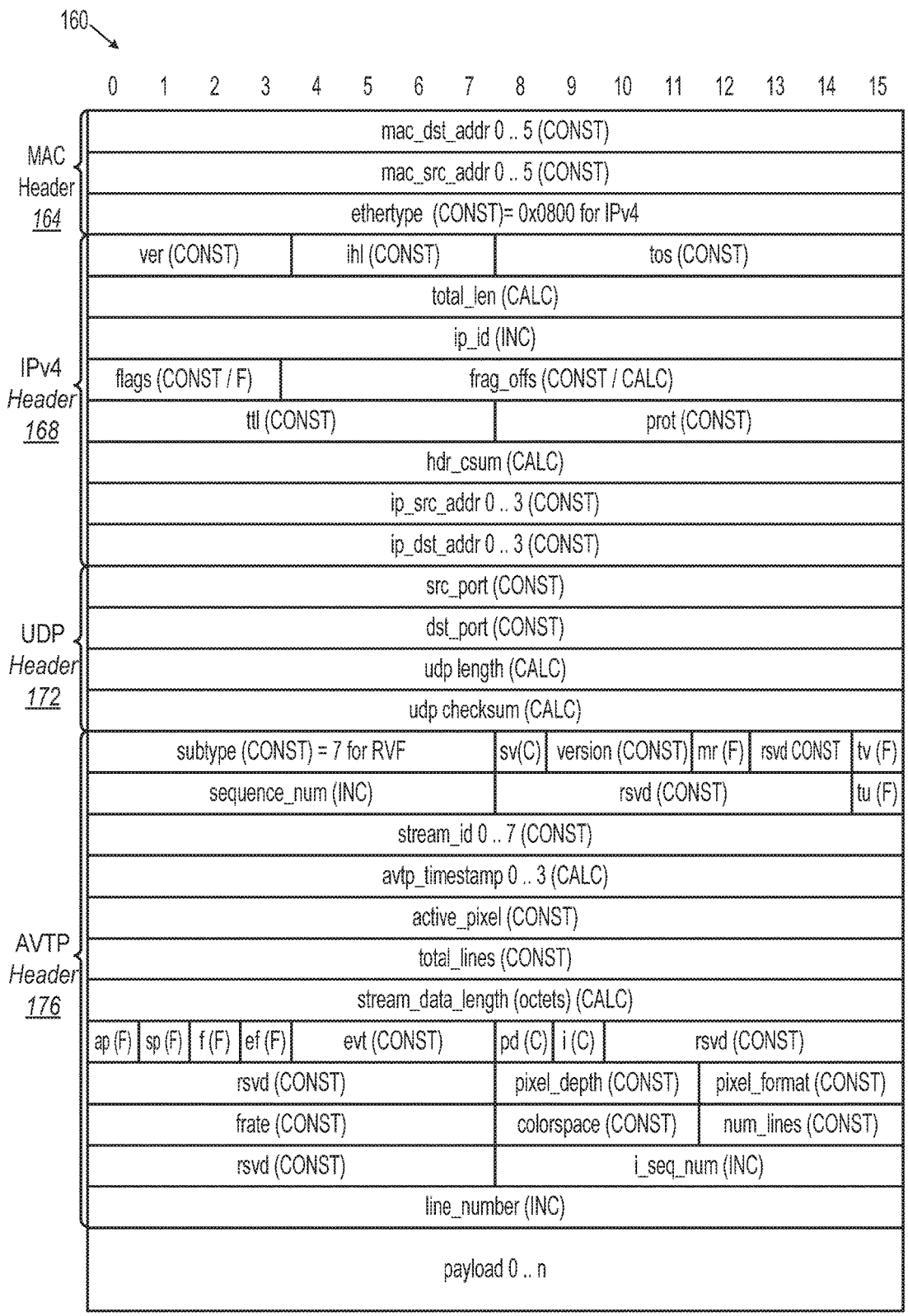
FIG. 5 is a diagram showing an example header format of a packet, in accordance with an embodiment that is described herein.

The header fields and header-field types listed above are depicted solely by way of example. In alternative embodiments, the header formats and header generator 76 supports any other suitable fields and/or types of header fields. An illustrative example of a header format, demonstrating the classification of the header fields into the various header-field types, is depicted in FIG. 5 below.

In some embodiments, header generator 76 sets the numerical value of a certain field in the registers of header template 92 by (i) reading the existing numerical value from the registers of the header template, (ii) performing some calculation on the existing numerical value to produce the updated value, and (iii) writing the updated numerical value to the registers of the header template. Such an update is performed, for example, in "incremented"-type fields, and also in some "calculated"-type fields such as checksums that are calculated over data spanning multiple Ethernet packets. Header generator 76 may perform this update between transmissions of successive Ethernet packets, at any time after the header of the previous packet has been transmitted.

Figure 4:
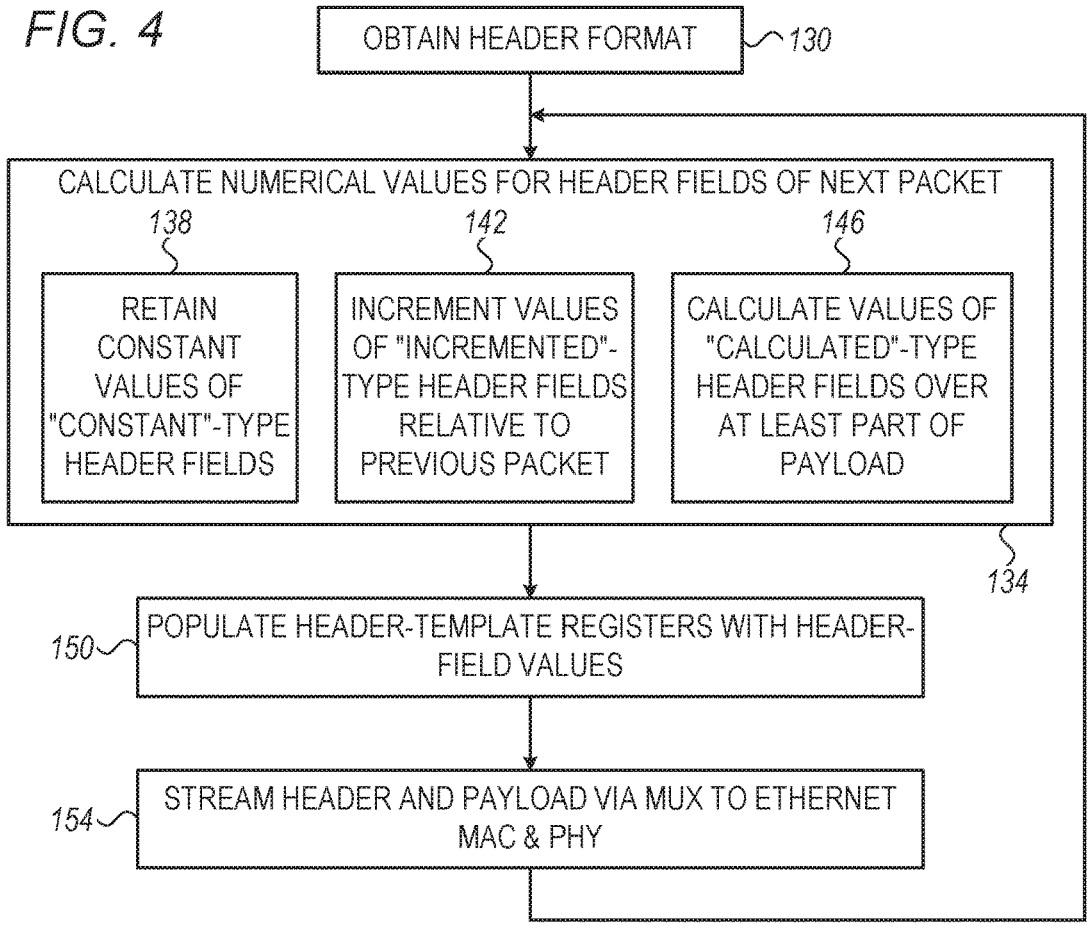
FIG. 4 is a flow chart that schematically illustrates a method for packet generation, in accordance with an embodiment that is described herein.

FIG. 4 is a flow chart that schematically illustrates a method for packet generation, in accordance with an embodiment that is described herein. The method begins with header generator 76 obtaining the applicable header format from header format selector 72, at a format initialization operation 130.

At a value calculation operation 134, header generator 76 calculates the numerical values to be inserted in the fields of the header of the current Ethernet header being generated. As explained above, header generator 76 identifies one or more "constant"-type, "incremented"-type and/or "calculated"-type fields in the header format, and calculates the numerical value for each header field based on its type.

For example, for any "constant"-type field in the header format, header generator 76 retains the same constant value for all packets, at a constant-field calculation sub-operation 138. For any "incremented"-type field in the header format, header generator 76 increments the numerical value relative to the value in the previous packet in accordance with the rule, at an incrementing-field calculation sub-operation 142. For any "calculated"-type field in the header format, header generator 76 calculates the numerical value, at a calculated-field calculation sub-operation 146.

At a header-template population operation 150, header generator 76 populates the hardware registers of header template 92 with the numerical values calculated at operation 134 above. At a transmission operation 154, packetizer 64 streams the header and payload of the Ethernet packet, en-route to MAC engine 84 and PHY interface 32.

FIG. 5 is a diagram showing an example header format of a packet 160, in accordance with an embodiment that is described herein. In the present example, the header of packet 160 comprises a MAC header 164, followed by an IPv4 header 168, a UDP header 172 and an AVTP header 176. MAC header 164 corresponds to layer-2, and the other headers correspond to higher layers, e.g., layer-3, layer-4 and/or layer-5. The packet header is followed by the packet payload.

Each "constant"-type field in the packet header of packet 160 is marked as "CONST" or "C". Each "incrementing"-type field is marked as "INC". Each "calculated"-type field is marked as "CALC". Flags (considered a special case of a "calculated"-type field) are marked as "F".

As can be seen in the figure, the entire MAC header 164 is "constant"-type. IPv4 header 168, on the other hand, comprises fields of all types. For example, the "ver" field specifies the IP version and is thus constant. The "total_len" field is a "calculated"-type field that is calculated from the payload length and the protocol selection. The "ip_id" field is an "incrementing"-type field that is incremented by one per packet. The classification of the "flags" fragmentation offset ("frag_offs") fields depends on whether IP fragmentation is supported or not. If supported, these fields are calculated for each packet. If not supported, these fields are constant.

UDP header 172 comprises both "constant"-type and "calculated"-type fields. The "udp_length" field, for example, is calculated per packet based on the payload length and the header length set by the protocol selection. AVTP header 176 comprises fields of all types. For example, the "sequence_num" field is an "incrementing"-type field that is incremented by one per packet. The "avtp_timestamp" is a "calculated"-type field comprising a calculated or sampled Precision Time Protocol (PTP) timer value. The "stream_data_length" is a "calculated"-type field calculated from the payload length. The "i_seq_num" and "line_number" fields are "incrementing"-type fields.

The packet header format shown in FIG. 5 is depicted purely by way of example, in order to demonstrate the use of the various types of packet-header fields. In alternative embodiments, any other suitable packet header formats can be used.

Although the embodiments described herein mainly address automotive networking applications, the methods and systems described herein can also be used in other applications, such as in live video streaming for monitoring or surveillance applications, live video and audio broadcast to video screens, Public Announcement (PA) equipment for concerts or public viewing events, having reduced delay between action on stage and video on the screens, or any other suitable application.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A conversion pipeline for converting media into Ethernet packets, the conversion pipeline comprising:
   a memory;
   a media input stage configured to receive from a media source a sequence of media frames carrying media content;
   a packetizer configured to convert the media frames into a sequence of Ethernet packets by generating headers on-the-fly, without writing the media frames into the memory, and appending portions of the media frames to corresponding generated headers, including appending a first portion of a first media frame to a first generated header before the first media frame is fully received from the media source;

an elasticity buffer, which is configured to compensate for a difference in clock speed between the media input stage and the packetizer, wherein the elasticity buffer has a buffer size that is less than a single media frame;

an Ethernet Medium Access Control (MAC) engine configured to commence outputting a first Ethernet packet as an uninterrupted unit, the first Ethernet packet comprising the first header and payload bits corresponding to the first portion of the first media frame, before the first media frame is fully received from the media source; and an Ethernet physical-layer (PHY) interface, configured to transmit the sequence of Ethernet packets over a network.

2. The conversion pipeline according to claim 1, wherein the packetizer comprises:
a header generator configured to generate the headers concurrently with reception of the media frames; and
a multiplexer (MUX), configured to interleave the headers with respective payloads that comprise the media content, so as to form a composite output stream.

3. The conversion pipeline according to claim 1, wherein the packetizer comprises logic circuitry configured to detect frame markers in the sequence of the media frames, and to partition the media content into successive payloads for successive Ethernet packets in accordance with the frame markers.

4. The conversion pipeline according to claim 3, wherein the packetizer is configured to begin each of the payloads of the Ethernet packets with one of the frame markers.

5. The conversion pipeline according to claim 1, wherein the media input stage is configured to receive input values from a sensor in addition to receiving the media frames, and wherein the packetizer is configured to convert both the media frames from the media source and the input values from the sensor into the sequence of Ethernet packets.

6. The conversion pipeline according to claim 1, wherein the media content comprises one or more of: video data, audio data, velocity data, acceleration data, infrared data, radar data, lidar data, ultrasonic imaging data, rangefinder data, proximity data, and collision avoidance data.

7. The conversion pipeline according to claim 1, wherein the conversion pipeline comprises one or more buffers configured to provide an end-to-end latency that is less than a duration of a single media frame.

8. A method for conversion of media into Ethernet packets in a hardware-implemented conversion pipeline, the method comprising:
receiving from a media source a sequence of media frames carrying media content;
converting the media frames into a sequence of Ethernet packets by generating headers on-the-fly, without writing the media frames into memory, and appending portions of the media frames to corresponding generated headers, including appending a first portion of a first media frame to a first generated header before the first media frame is fully received from the media source;
compensating for a difference in clock speed in the conversion pipeline using an elasticity buffer, wherein the elasticity buffer has a buffer size that is less than a single media frame;
commencing outputting a first Ethernet packet as an uninterrupted unit, the first Ethernet packet comprising the first header and payload bits corresponding to the first portion of the first media frame, before the first media frame is fully received from the media source; and
transmitting the sequence of Ethernet packets produced by the conversion pipeline through a physical-layer (PHY) interface to a network.

9. The method according to claim 8, further comprising receiving input values from a sensor in addition to receiving the media frames, and wherein converting the media frames into the Ethernet packets comprises converting both the media frames from the media source and the input values from the sensor into the sequence of Ethernet packets.

10. The method according to claim 8, wherein receiving the media content comprises receiving one or more of: video data, audio data, velocity data, acceleration data, infrared data, radar data, lidar data, ultrasonic imaging data, rangefinder data, proximity data, and collision avoidance data.

11. The method according to claim 8, wherein converting the media frames into the Ethernet packets comprises generating the headers concurrently with reception of the media frames, and interleaving the headers with respective payloads that comprise the media content so as to form a composite output stream.

12. The method according to claim 8, wherein converting the media frames into the Ethernet packets comprises detecting frame markers in the sequence of the media frames, and partitioning the media content into successive payloads for successive Ethernet packets in accordance with the frame markers.

13. The method according to claim 12, wherein partitioning the media content comprises beginning each of the payloads of the Ethernet packets with one of the frame markers.

14. The method according to claim 8, wherein converting the media frames into the Ethernet packets comprises buffering the media content in one or more buffers having an end-to-end latency that is less than a duration of a single media frame.

* * * * *